(12) United States Patent
Cheng

(10) Patent No.: US 8,750,716 B2
(45) Date of Patent: Jun. 10, 2014

(54) AUTOMATIC POWER ADJUSTMENT SYSTEM AND METHOD FOR OPTICAL NETWORK SYSTEM

(75) Inventor: Yuren Cheng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 217 days.

(21) Appl. No.: 13/496,082

(22) PCT Filed: Sep. 13, 2010

(86) PCT No.: PCT/CN2010/076853
§ 371 (c)(1),
(2), (4) Date: Mar. 14, 2012

(87) PCT Pub. No.: WO2011/032480
PCT Pub. Date: Mar. 24, 2011

(65) Prior Publication Data
US 2012/0177369 A1 Jul. 12, 2012

(30) Foreign Application Priority Data
Sep. 16, 2009 (CN) .......................... 2009 1 0177582

(51) Int. Cl.
*H04B 10/00* (2013.01)
(52) U.S. Cl.
USPC ............................... 398/141; 398/38; 398/177
(58) Field of Classification Search
USPC ............................ 398/140–141, 158–160, 25
See application file for complete search history.

(56) References Cited

U.S. PATENT DOCUMENTS

| 6,304,347 | B1 * | 10/2001 | Beine et al. ..................... 398/38 |
| 6,392,769 | B1 * | 5/2002 | Ford et al. ......................... 398/9 |
| 6,449,068 | B1 * | 9/2002 | Turner et al. .................... 398/38 |
| 6,701,087 | B2 * | 3/2004 | Beine et al. ..................... 398/38 |
| 6,996,323 | B2 * | 2/2006 | Scarth et al. .................. 385/140 |
| 6,999,686 | B1 * | 2/2006 | Ryhorchuk .................. 398/162 |
| 7,072,561 | B2 * | 7/2006 | Scarth et al. .................. 385/140 |

(Continued)

FOREIGN PATENT DOCUMENTS

| CN | 1612514 A | 5/2005 |
| CN | 1863027 A | 11/2006 |
| CN | 101656577 A | 2/2010 |
| JP | 2002354511 A | 12/2002 |

OTHER PUBLICATIONS

International Search Report for PCT/CN2010/076853 dated Nov. 29, 2010.

*Primary Examiner* — Agustin Bello
(74) *Attorney, Agent, or Firm* — Ling Wu; Stephen Yang; Ling and Yang Intellectual Property

(57) ABSTRACT

An apparatus and method for automatic power adjustment of an optical network system are provided by the present invention. In the automatic power adjustment system which includes a plurality of electric-adjustable optical attenuators and a power adjustment module configured in a network management board: each OA board, i.e. optical amplification board and each service forwarding board respectively report their power relevant parameters to the power adjustment module; the power adjustment module judges whether an adjustment is required for an OA board and/or a service forwarding board after performing calculation according to the power parameters reported by each OA board and each service forwarding board, and when determining that the adjustment is required, triggers the adjustable optical attenuator on the corresponding OA board and/or the service forwarding board to perform the power adjustment.

7 Claims, 5 Drawing Sheets

(56) References Cited

U.S. PATENT DOCUMENTS

| | | | |
|---|---|---|---|
| 7,218,858 B1* | 5/2007 | Lundquist et al. | 398/94 |
| 7,447,432 B2* | 11/2008 | Fielding et al. | 398/38 |
| 7,505,683 B1* | 3/2009 | Lemieux et al. | 398/4 |
| 2002/0080438 A1* | 6/2002 | Beine et al. | 359/110 |
| 2003/0063343 A1* | 4/2003 | Pheiffer et al. | 359/110 |
| 2004/0109661 A1 | 6/2004 | Bierman et al. | |
| 2004/0120712 A1* | 6/2004 | Ng et al. | 398/41 |
| 2004/0208538 A1* | 10/2004 | Liwak | 398/45 |
| 2007/0053650 A1 | 3/2007 | Shimada et al. | |
| 2009/0092391 A1* | 4/2009 | Zong et al. | 398/79 |
| 2012/0177369 A1* | 7/2012 | Cheng | 398/38 |

* cited by examiner

AUTOMATIC POWER ADJUSTMENT SYSTEM AND METHOD FOR OPTICAL NETWORK SYSTEM

TECHNICAL FIELD

The present invention relates to the field of an optical network technology, and in particular, to a system and method for automatic power adjustment of an optical network system.

BACKGROUND OF THE RELATED ART

FIG. 1 is a structure schematic diagram of the existing optical network system, as shown in FIG. 1. At present, the adjustment of the optical power point of the optical network system is performed through adding an optical attenuator to the external interface and then measuring the optical power manually. The manual adjustment has the following disadvantages:

the adjustment waste time and energy; if the board needs to be changed in the process of adjustment, the problem that the adjustment on the optical power is required again will appear; and in the process of maintenance, it may cause the customer inconvenience to use;

the failure rate of the optical attenuator on the interface is very high;

the output interface of the optical attenuator connected to the interface is relatively longer, so it will cause the production of the error code if touching it in operation because of carelessness;

the existing optical network system generally includes a lot of things, so in the realizing project, if the manual adjustment is adopted for its optical power, it is very difficult to have a full understanding of system, and the adjustment must be performed on the network management.

SUMMARY OF THE INVENTION

Considering the above analysis, the present invention is intended to provide a system and method for automatic power adjustment of an optical network system, which can adjust the optical power automatically and saves the manpower cost and the adjustment time.

The purpose of the present invention is mainly realized through the following technical scheme:

the present invention provides a system for automatic power adjustment of an optical network system, comprising electric-adjustable optical attenuators and a power adjustment module configured in a network management board, wherein, the electric-adjustable optical attenuators are respectively embedded in a line output port of a service forwarding board, a line input port of an OA board, that is optical amplification board and a line input port of the service forwarding board, to adjust power of the service forwarding board and/or the OA board;

the power adjustment module is configured to calculate and judge whether a power adjustment is required for the OA board and/or the service forwarding board according to power relevant parameters reported by each OA board and each service forwarding board, and when determining that the adjustment is required, trigger the electric-adjustable optical attenuator on a corresponding OA board and/or service forwarding board to perform the power adjustment.

The power adjustment module specifically comprises a first calculation adjustment unit and a second calculation adjustment unit, wherein, the first calculation adjustment unit is configured to judge whether a current output optical power reported by the service forwarding board is greater than a target output optical power preset by the service forwarding board and trigger the electric-adjustable optical attenuators on the corresponding service forwarding board when determining that the current output optical power reported by the service forwarding board is greater than the target output optical power which is preset;

the second calculation adjustment unit is configured to calculate and obtain a single-wave expected input optical power of the OA board according to an optical power gain, a saturation output optical power and a wavelength number of an input wave reported by the OA board and trigger the electric-adjustable optical attenuators on the corresponding OA board after determining that a current single-wave input optical power reported by the OA board is greater than the single-wave expected input optical power of the OA board.

The first calculation adjustment unit is further configured to adjust an input optical power of the service forwarding board according to a type of an input module in the service forwarding board.

The second calculation adjustment unit specifically comprises:

a calculation unit, configured to obtain the single-wave output optical power of the OA board from the saturation output optical power of the OA board minus 10*lgN, and then obtain the single-wave expected input optical power of the OA board from the single-wave output optical power of the OA board minus the optical power gain reported by the OA board; wherein, N represents the wavelength number of the input wave;

a judging unit, configured to perform judgment according to whether the current single-wave input optical power reported by the OA board is greater or less than the single-wave expected input optical power of the OA board, and trigger the electric-adjustable optical attenuators on the corresponding OA board when determining that the current single-wave input optical power reported by the OA board is greater than the single-wave expected input optical power of the OA board.

A method for automatic power adjustment of an optical network system is provided, and in an automatic power adjustment system comprising electric-adjustable optical attenuators and a power adjustment module configured in a network management board, the method comprises:

step A, each OA board, i.e. optical amplification board and each service forwarding board respectively reporting power relevant parameters of each OA board and each service forwarding board to the power adjustment module;

step B, the power adjustment module judging whether an adjustment is required for the OA board and/or the service forwarding board after performing calculation according to power parameters reported by each OA board and each service forwarding board, and when determining that the adjustment is required, triggering the electric-adjustable optical attenuator on the corresponding OA board and/or the service forwarding board to perform the power adjustment.

The step A specifically comprises:

said each service forwarding board reporting a current output optical power of each service forwarding board to the power adjustment module respectively; and said each OA board reporting an optical power gain, a saturation output optical power, a wavelength number of an input wave, and a current single-wave input optical power of each OA board to the power adjustment module.

The step B specifically comprises:

step B1, the power adjustment module judging whether the output optical power reported by the service forwarding board is greater than a target output optical power preset by the service forwarding board; and if yes, triggering the electric-adjustable optical attenuators on the corresponding service forwarding board; or else not performing the adjustment;

step B2, the power adjustment module obtaining a single-wave expected input optical power of the OA board after performing calculation according to the optical power gain, the saturation output optical power and the wavelength number of the input wave reported by the OA board and then judging whether the current single-wave input optical power reported by the OA is greater than the single-wave expected input optical power of the OA board; and if yes, triggering the electric-adjustable optical attenuators on the corresponding OA board; or else not performing the adjustment.

The step B1 further comprises:

the power adjustment module adjusting the input optical power of the service forwarding board according to a type of an input module in the service forwarding board.

The step B2 specifically comprises:

step B21, the power adjustment module obtaining the single-wave output optical power of the OA board from the saturation output optical power reported by the OA board minus 10*lgN, and then obtaining the single-wave expected input optical power of the OA board from the single-wave output optical power of the OA board minus the optical power gain reported by the OA board; wherein, N represents the wavelength number of the input wave;

step B22, judging whether a current single-wave input optical power reported by the OA is greater than a single-wave expected input optical power of the OA board; and if yes, triggering the electric-adjustable optical attenuators on the corresponding OA board; or else, not performing the adjustment.

The advantage of the present invention is as follows:

the present invention overcomes the problem of manual adjustment of the optical power point in the optical network system in the related art and the problem that the adjustment must be performed under the condition of the network management, thereby saving the manpower cost and the debugging time, and performing the algorithmic automatic power adjustment without the network management.

Other features and advantages of the present invention will be illustrated in the following specification, and part of them will become obvious from the specification, or be known by implementing the present invention. The purpose and other advantages of the present invention can be implemented and obtained from the structure specifically pointed out by the described specification, claims and the accompanying drawings.

PREFERRED EMBODIMENTS OF THE PRESENT INVENTION

The preferred embodiment of the present invention is described in detail with reference to the accompanying drawings hereinafter, wherein the figures form a part of the present application and they are used for explaining the principle of the present invention together with the embodiment of the present invention. For the purpose of clarification and simplification, when it may make the subject of the present invention blurred, it will omit the known function and the detailed specification of the structure in the device that this text describes.

Figure 1:
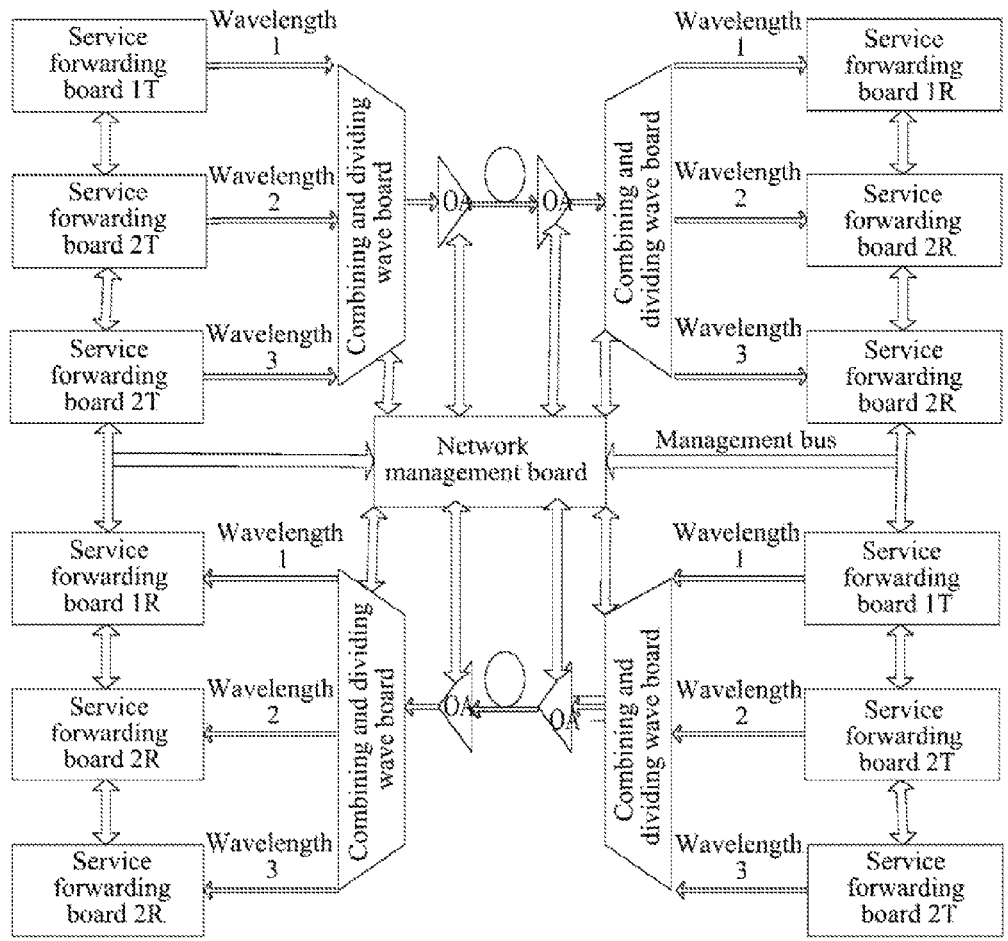
FIG. 1 is a structure schematic diagram of an existing optical network system.
Figure 2:
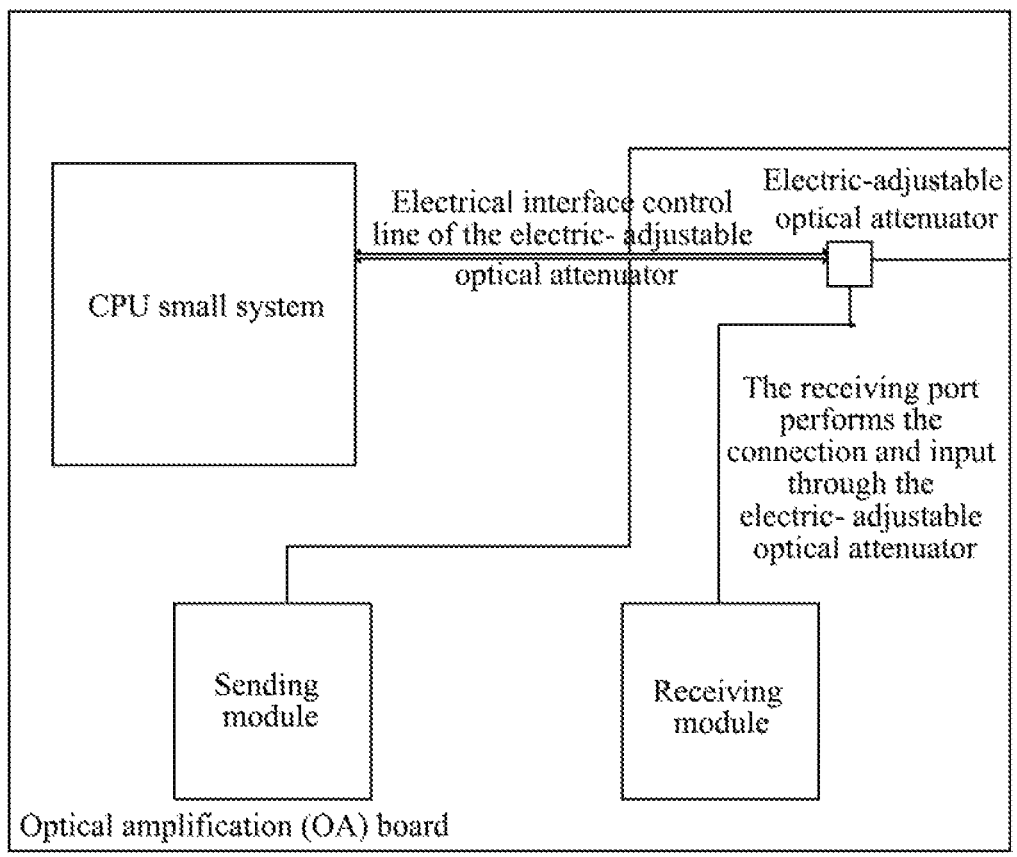
FIG. 2 is a schematic diagram of an electric-adjustable optical attenuator embedded in an OA board according to an embodiment of the present invention.
Figure 3:
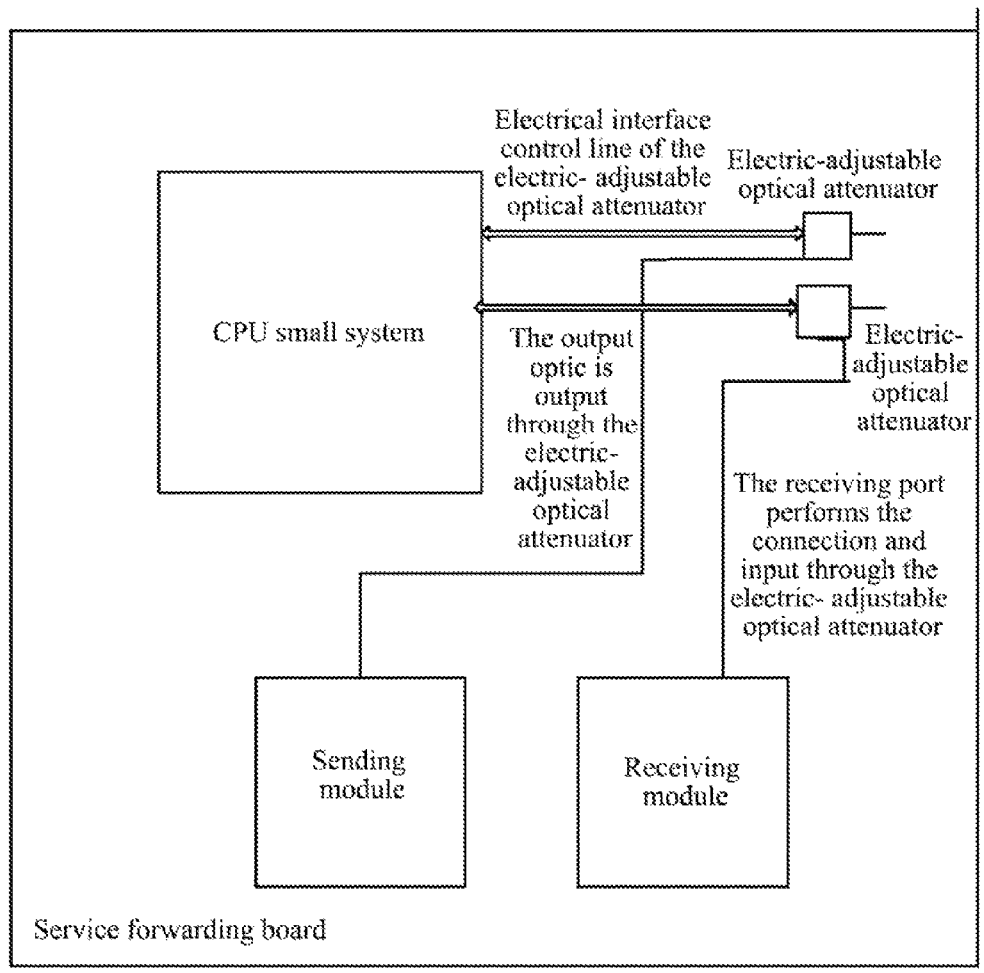
FIG. 3 is a schematic diagram of an electric-adjustable optical attenuator embedded in a service forwarding board according to an embodiment of the present invention.

The system for automatic power adjustment of the present invention specifically includes a plurality of electric-adjustable optical attenuators and a power adjustment module configured in a network management board, wherein a plurality of electric-adjustable optical attenuators are shown in FIG. 2 and FIG. 3. FIG. 2 is a schematic diagram of an electric-adjustable optical attenuator embedded in an optical amplification (OA) board, and FIG. 3 is a schematic diagram of an electric-adjustable optical attenuator embedded in a service forwarding board. A plurality of electric-adjustable optical attenuators are embedded in a line output port of a service forwarding board, a line input port of an OA board and a line input port of the service forwarding board respectively; wherein the electric-adjustable optical attenuator installed in the line output port of the service forwarding board realizes the output optical power adjustment of the service forwarding board; the electric-adjustable optical attenuator installed in the input port of the OA board realizes the input optical power adjustment of the OA board; and the electric-adjustable optical attenuator installed in the line input port of the service forwarding board realizes the input optical power adjustment of the service forwarding board. In the embodiment of the present invention, according to the experience, the adjustment range of the optical power of the electric-adjustable optical attenuator can meet the requirements in 0-30 dB.

Figure 4:
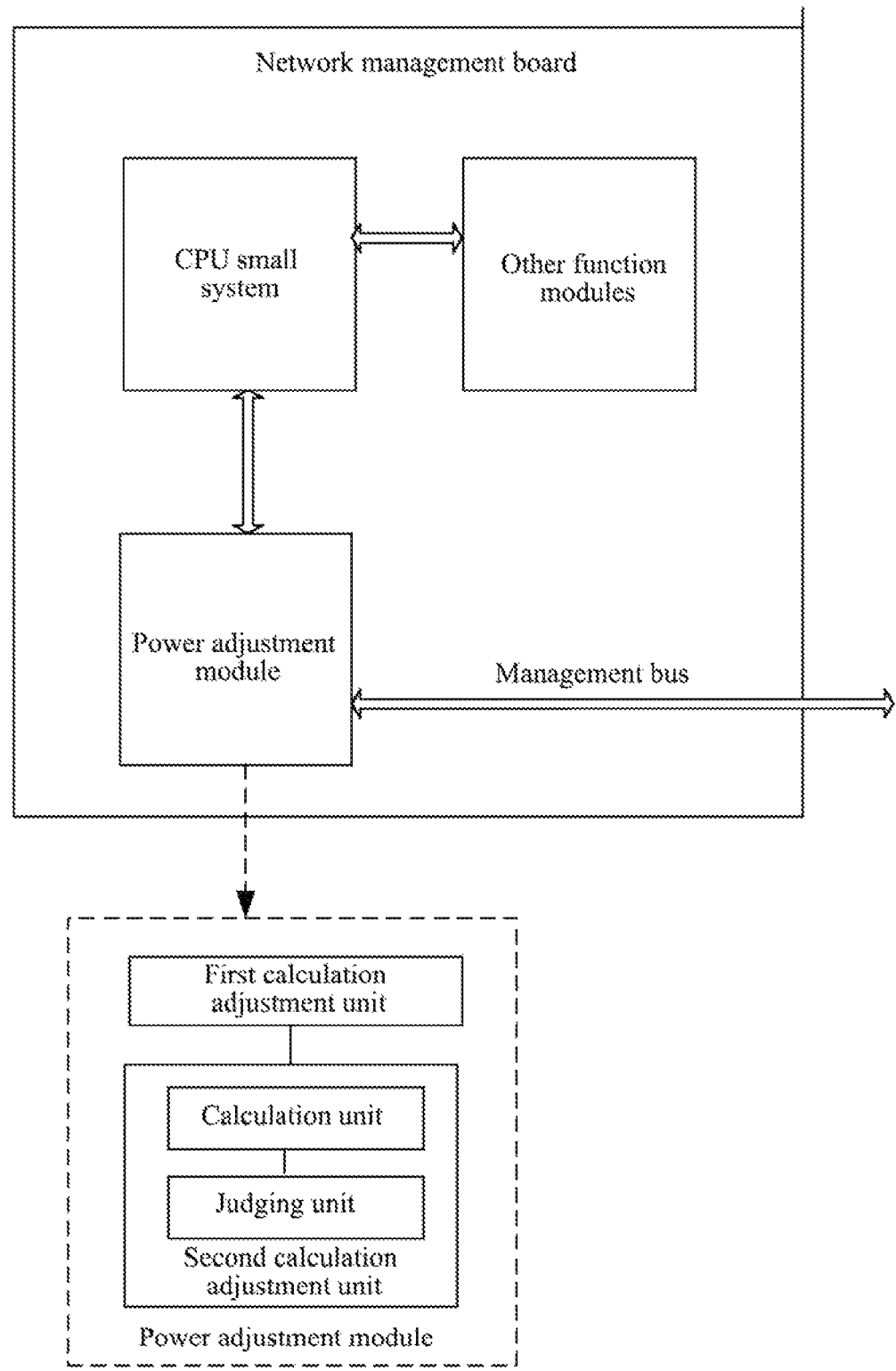
FIG. 4 is a schematic diagram of a power adjustment module configured in a network management board according to an embodiment of the present invention.

FIG. 4 is a schematic diagram of a power adjustment module configured in a network management board. As shown in FIG. 4, the power adjustment module is mainly used to perform an automatic adjustment on the output optical power of the corresponding service forwarding board and/or the input optical power of the corresponding OA board after performing calculation according to power relevant parameters reported by each service forwarding board and OA board, which specifically includes a first calculation adjustment unit and a second calculation adjustment unit, wherein in the first calculation adjustment unit, a target output optical power is preset (in normal situation, the target optical power should be less than the output optical power of the service forwarding board, so the target optical power can be set as −4 dB or −5 dB according to the normal output optical power of the service forwarding board), and the adjustment is performed according to whether the target output optical power is less than the output optical power of the service forwarding board;

the first calculation adjustment unit is used to receive the current output optical power reported by each service forwarding board in real time, and judge whether to adjust the output optical power of each service forwarding board respectively according to the target output optical power of the service forwarding board: if the current output optical power of a certain service forwarding board is greater than the target output optical power of the service forwarding board, the power adjustment module triggers the electric-adjustable optical attenuator on the corresponding service forwarding board to perform the adjustment, and reduces the output optical power of the service forwarding board; if the current output optical power of a certain service forwarding board is less than the expected output optical power of the service forwarding board, the adjustment is not performed, however, an event or an alarm is reported.

The first calculation adjustment unit is also used to determine the adjustment range of the output optical power of the service forwarding board according to the type of the existing input module on the service forwarding board. Since the range of the input optical power of the PIN type (P type-intrinsic-N type) is from 0 dB to −17 dB and the range of the input optical power of the APD (avalanche photodiode) type is from −9 dB to −29 dB, it can receive the service normally so long as within this range. The system has already realized the type of the input module of the service board at present, which belongs to the technology known by those skilled in the art, and it will no longer be described here.

The second calculation adjustment unit is used to receive the optical power gain, the saturation output optical power, the wavelength number of the input wave and the input optical power reported by the OA board in real time, calculate and obtain the single-wave expected input optical power of the OA board according to the sum of the optical power gain, the saturation output optical power and the wavelength number of the input wave of the OA board; judge whether to perform the automatic adjustment through comparing the single-wave expected input optical power of the OA board with the current single-wave input optical power reported by the OA board: if the current single-wave input optical power of the OA board is lower than the single-wave expected input optical power of the OA board, it does not perform the adjustment; if the current single-wave input optical power of the OA board is higher than the single-wave expected input optical power of the OA board, it triggers the adjustable attenuator on the corresponding OA board to perform the adjustment, thus the purpose of reducing the input optical power of the OA board is achieved.

The second calculation adjustment unit can realize the software programming by using the CPU small system combined with the database of the original system, it can include specifically: a calculation unit and a judging unit; wherein the calculation unit is used to calculate and obtain the single-wave expected input optical power of the OA board according to the sum of the optical power gain of the OA board, the saturation output optical power and the wavelength number of the input wave of the OA board, and the specific algorithm is as follows:

the single-wave output optical power of the OA board=the saturation output optical power−10*lgN, wherein, $N$ represents the wavelength number of the input wave, for example, $N$ equals 40 waves;

the single-wave expected input optical power of the OA board=the single-wave output optical power of the OA board−the optical power gain of the OA board.

The judging unit is used to perform judgment according to whether the current single-wave input optical power reported by the OA board is greater or less than the single-wave expected input optical power of the OA board: if the current single-wave input optical power reported by the OA board is greater than the single-wave expected input optical power of the OA board, the electric-adjustable optical attenuator on the corresponding OA board is triggered; or else the adjustment is not performed.

Figure 5:
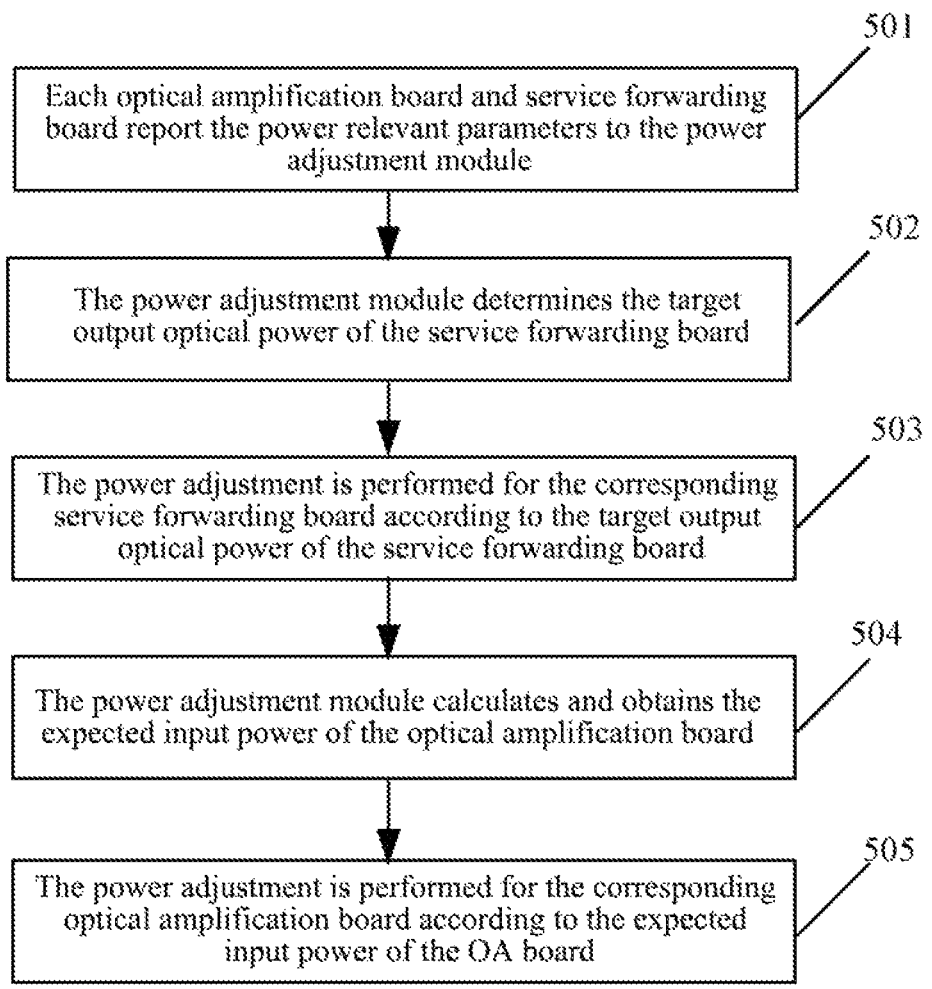
FIG. 5 is a flow chart of the method according to an embodiment of the present invention.

And then the method described in the embodiment of the present invention is illustrated in detail combining with FIG. 5.

The method described in the embodiment of the present invention utilizes the above-mentioned system for automatic power adjustment, as shown in FIG. 5, and it can include the following steps specifically:

in step 501, each service forwarding board reports the optical power output by itself to the power adjustment module; each OA board reports its own optical power gain, the saturation output optical power, the wavelength number of the input wave and the single-wave input optical power to the power adjustment module in real time.

In step 502, the power adjustment module determines the target output optical power of the service forwarding board, that is, one target output optical power is set.

In step 503, the power adjustment module receives the current output optical power reported by each service forwarding board, and adjusts the output optical power of each service forwarding board respectively according to the target output optical power of the service forwarding board: if the current output optical power of a certain service forwarding board is greater than the target output optical power of the service forwarding board, it can adjust and reduce the output optical power of the service forwarding board through the electric-adjustable optical attenuators; if the current output optical power of a certain service forwarding board is less than the target output optical power of the service forwarding board, the adjustment is not performed.

In step 504, the power adjustment module, when receiving the optical power gain, the saturation output optical power, the wavelength number of the input wave and the single-wave input optical power reported by the OA board in real time, calculates and obtains the single-wave expected input optical power of the OA board according to the optical power gain, the saturation output optical power, the wavelength number of the input wave of the OA board.

In step 505, the power adjustment module compares the single-wave expected input optical power of the OA board with the single-wave input optical power reported by the OA board; if the single-wave input optical power of the OA board is lower than the single-wave expected input optical power of the OA board, the adjustment is not performed; if the current single-wave input optical power of the OA board is higher than the single-wave expected input optical power of the OA board, the adjustable attenuator on the OA board is triggered to perform the adjustment, thus the purpose of reducing the single-wave input optical power of the OA board is achieved.

The specific calculation and adjustment process of the power adjustment module refers to the description of the system of the present invention, which is not described in detail here.

In sum, the embodiment of the present invention provides a system and method for automatic power adjustment of an optical network system. Since the embodiment of the present invention embeds the adjustable attenuator on the service forwarding board and the OA board and configures the power adjustment module on the network management board, which overcomes the problem of manual adjustment of the optical power point in the optical network in the related art and the problem that the adjustment must be performed under the condition of the network management.

Compared with existing technology, since the embodiment of the present invention adopts one kind of much reliable and stable technical measure, the automation progress is made in the debugging and maintaining process of the optical network, manpower cost and the debugging time are saved, and on the premise of guaranteeing the optic fiber quality, the algorithmic automatic power adjustment is performed without the network management and the reliability of the adjustment of the optical power point is improved.

The above description is only the preferred embodiments of the present invention and is not intended to limit the scope of the present invention. Those skilled in the art can think easily about the variations or replacements in the technical scope disclosed by the present invention. All of variations or replacements should be included in the protection scope of the present invention. Therefore, the scope of the present invention is subject to the protection scope of the appended claims.

What is claimed is:

1. A system for automatic power adjustment of an optical network system, comprising electric-adjustable optical attenuators and a power adjustment module configured in a network management board, wherein, the electric-adjustable optical attenuators is embedded in a line output port of a service forwarding board, a line input port of an optical amplification (OA) board and a line input port of the service forwarding board respectively, and is configured to adjust powers of the service forwarding board and/or the OA board;

the power adjustment module is configured to calculate and judge whether a power adjustment is required for the OA board and/or the service forwarding board according to power relevant parameters reported by each OA board and each service forwarding board, and when determining that the adjustment is required, trigger the electric-adjustable optical attenuator on a corresponding OA board and/or service forwarding board to perform the power adjustment;

wherein the power adjustment module specifically comprises a first calculation adjustment unit and a second calculation adjustment unit, wherein, the first calculation adjustment unit is configured to judge whether a current output optical power reported by the service forwarding board is greater than a target output optical power preset by the service forwarding board and trigger the electric-adjustable optical attenuators on the corresponding service forwarding board when determining that the current output optical power reported by the service forwarding board is greater than the preset target output optical power; and the second calculation adjustment unit is configured to calculate and then obtain a single-wave expected input optical power of the OA board according to an optical power gain, a saturation output optical power and a wavelength number of an input wave reported by the OA board and trigger the electric-adjustable optical attenuators on the corresponding OA board after determining that a current single-wave input optical power reported by the OA board is greater than the single-wave expected input optical power of the OA board.

2. The system according to claim 1, wherein the first calculation adjustment unit is further configured to adjust an input optical power of the service forwarding board according to a type of an input module in the service forwarding board.

3. The system according to claim 1, wherein the second calculation adjustment unit specifically comprises:

a calculation unit, configured to obtain a single-wave output optical power of the OA board from the saturation output optical power of the OA board minus 10*lgN, and then obtain the single-wave expected input optical power of the OA board from the single-wave output optical power of the OA board minus the optical power gain reported by the OA board; wherein, N represents the wavelength number of the input wave; and a judging unit, configured to perform judgment according to whether the current single-wave input optical power reported by the OA board is greater or less than the single-wave expected input optical power of the OA board, and trigger the electric-adjustable optical attenuators on the corresponding OA board when determining that the current single-wave input optical power reported by the OA board is greater than the single-wave expected input optical power of the OA board.

4. A method for automatic power adjustment of an optical network system, in an automatic power adjustment system comprising electric-adjustable optical attenuators and a power adjustment module configured in a network management board, comprising:

step A, each optical amplification (OA) board and each service forwarding board respectively reporting power relevant parameters of each OA board and each service forwarding board to the power adjustment module; and step B, the power adjustment module judging whether an adjustment is required for the OA board and/or the service forwarding board after performing calculation according to power parameters reported by each OA board and each service forwarding board, and when determining that the adjustment is required, triggering the electric-adjustable optical attenuator on a corresponding OA board and/or service forwarding board to perform a power adjustment;

wherein, the step A specifically comprises:

said each service forwarding board reporting a current output optical power of each service forwarding board to the power adjustment module respectively; and said each OA board reporting an optical power gain, a saturation output optical power, a wavelength number of an input wave, and a current single-wave input optical power of each OA board to the power adjustment module;

the step B specifically comprises:

step B1, the power adjustment module judging whether an output optical power reported by the service forwarding board is greater than a target output optical power preset by the service forwarding board, and if yes, triggering the electric-adjustable optical attenuators on the corresponding service forwarding board, or else not performing the adjustment; and step B2, the power adjustment module obtaining a single-wave expected input optical power of the OA board after performing calculation according to the optical power gain, the saturation output optical power and the wavelength number of the input wave reported by the OA board and then judging whether the current single-wave input optical power reported by OA is greater than the single-wave expected input optical power of the OA board, and if yes, triggering the electric-adjustable optical attenuators on the corresponding OA board, or else not performing the adjustment.

5. The method according to claim 4, wherein, the step B1 further comprises:

the power adjustment module adjusting an input optical power of the service forwarding board according to a type of an input module in the service forwarding board.

6. The method according to claim 4, wherein, the step B2 specifically comprises:

step B21, the power adjustment module obtaining a single-wave output optical power of the OA board from the saturation output optical power reported by the OA board minus $10*\lg N$, and then obtaining the single-wave expected input optical power of the OA board from the single-wave output optical power of the OA board minus the optical power gain reported by the OA board; wherein, N represents the wavelength number of the input wave; and step B22, judging whether the current single-wave input optical power reported by OA is greater than the single-wave expected input optical power of the OA board, and if yes, triggering the electric-adjustable optical attenuators on the corresponding OA board, or else, not performing the adjustment.

7. The system according to claim 2, wherein the second calculation adjustment unit specifically comprises:

a calculation unit, configured to obtain a single-wave output optical power of the OA board from the saturation output optical power of the OA board minus $10*\lg N$, and then obtain the single-wave expected input optical power of the OA board from the single-wave output optical power of the OA board minus the optical power gain reported by the OA board; wherein, N represents the wavelength number of the input wave; and a judging unit, configured to perform judgment according to whether the current single-wave input optical power reported by the OA board is greater or less than the single-wave expected input optical power of the OA board, and trigger the electric-adjustable optical attenuators on the corresponding OA board when determining that the current single-wave input optical power reported by the OA board is greater than the single-wave expected input optical power of the OA board.

* * * * *